United States Patent [19]

Onishi et al.

[11] Patent Number: 5,555,340
[45] Date of Patent: Sep. 10, 1996

[54] OPTICAL TRANSMISSION SYSTEM WITH DISPERSION COMPENSATING OPTICAL FIBER

[75] Inventors: Masashi Onishi; Hiroo Kanamori, both of Yokohama, Japan

[73] Assignee: Sumitomo Electric Industries, Ltd., Osaka, Japan

[21] Appl. No.: 523,750

[22] Filed: Sep. 5, 1995

Related U.S. Application Data

[63] Continuation of Ser. No. 408,620, Mar. 23, 1995, abandoned.

[30] Foreign Application Priority Data

Mar. 23, 1994 [JP] Japan .................................. 6-051680

[51] Int. Cl.$^6$ .................................................. G02B 6/22
[52] U.S. Cl. ........................ 385/127; 385/124; 385/126; 359/161
[58] Field of Search ...................... 385/123, 124, 385/126–128; 359/161, 188, 195

[56] References Cited

U.S. PATENT DOCUMENTS

| | | | |
|---|---|---|---|
| 3,997,241 | 12/1976 | Nishida et al. | 385/127 |
| 4,372,647 | 2/1983 | Okamoto et al. | 385/127 |

(List continued on next page.)

FOREIGN PATENT DOCUMENTS

| | | |
|---|---|---|
| 0402895 | 12/1990 | European Pat. Off. . |
| 0554714 | 8/1993 | European Pat. Off. . |
| 0598554 | 5/1994 | European Pat. Off. . |
| 55-25643 | 7/1980 | Japan . |
| 62-275207 | 11/1987 | Japan . |
| 611620 | 1/1994 | Japan . |
| 6222235 | 8/1994 | Japan . |
| 2118321 | 10/1983 | United Kingdom . |

OTHER PUBLICATIONS

Onishi et al, "High NA Double–Cladding Dispersion Compensating Fiber for WDM Systems", ECOC '94, 20th European Conference on Optical Communication, Sep. 25–29, 1994, Firenze, Italy, vol. 2, pp. 681–684.

Sudo et al, "Efficient Non–Linear Optical fibres and Their Applications", Optical and Quantum Electronics, vol. 22, No. 3, May 1990, pp. 187–212.

Kubo et al, "Characteristics of Low Disperation SM Fiber With Double Cladding", published Mar. 18, 1990, Sumitomo Electric Industries, Ltd. (English translation enclosed).

Kubo et al, "Dispersion Flattened Single–Mode Fiber for 10,000 km Transmission System", published Sep. 16, 1994 Sumitomo Electric Industries, Ltd. (English translation enclosed).

Patent Abstracts of Japan, vol. 012, No. 161 (P–702), May 17, 1988 & JP–A–62 275207 (Fujitsu Ltd), Nov. 30, 1987.

Patent Abstracts of Japan, vol. 015, No. 399 (P–1261), Oct. 9, 1991 & JP–A–03 160403 (Hitachi Cable Ltd), Jul. 10, 1991.

*Primary Examiner*—Rodney B. Bovernick
*Assistant Examiner*—Hemang Sanghavi
*Attorney, Agent, or Firm*—Cushman Darby & Cushman, L.L.P.

[57] ABSTRACT

A dispersion compensating fiber has a negative chromatic dispersion slope and a value of chromatic dispersion suitable for practical application, and a bending loss thereof with a bending diameter of 40 mm is smaller than 0.01 dB/m at 1.55 μm. A diameter of a core is larger than 3 μm but smaller than 4 μm. A ratio (Da/Db) of the diameter of the core to an outer diameter of a first cladding is between 0.4 and 0.6 both inclusive. A relative refractive index difference of the core to a second cladding, (nc−n2)/n2, is larger than 0.02 but smaller than 0.03. A relative refractive index difference of the first cladding to the second cladding, (n2−n1)/n2, is larger than 0.004 but smaller than 0.01. This dispersion compensating optical fiber has a sufficient negative chromatic dispersion slope at wavelengths (1.55 μm to 1.65 μm both inclusive) around 1.55 μm and a bending loss thereof at the wavelength of 1.55 μm with the bending diameter of 40 mm is smaller than 0.01 dB/m.

17 Claims, 18 Drawing Sheets

U.S. PATENT DOCUMENTS

| | | | |
|---|---|---|---|
| 4,406,732 | 9/1983 | Kayoun | 385/127 X |
| 4,447,127 | 5/1984 | Cohen et al. | 385/127 |
| 4,715,695 | 12/1987 | Nishimura et al. | 385/127 |
| 4,838,643 | 6/1989 | Hodges et al. | 385/127 |
| 4,969,710 | 11/1990 | Tick et al. | 385/123 |
| 5,032,001 | 7/1991 | Shang | 385/127 X |
| 5,115,486 | 5/1992 | Bader et al. | 385/124 |
| 5,278,931 | 1/1994 | Antos et al. | 385/126 |
| 5,361,319 | 11/1994 | Antos et al. | 385/123 |

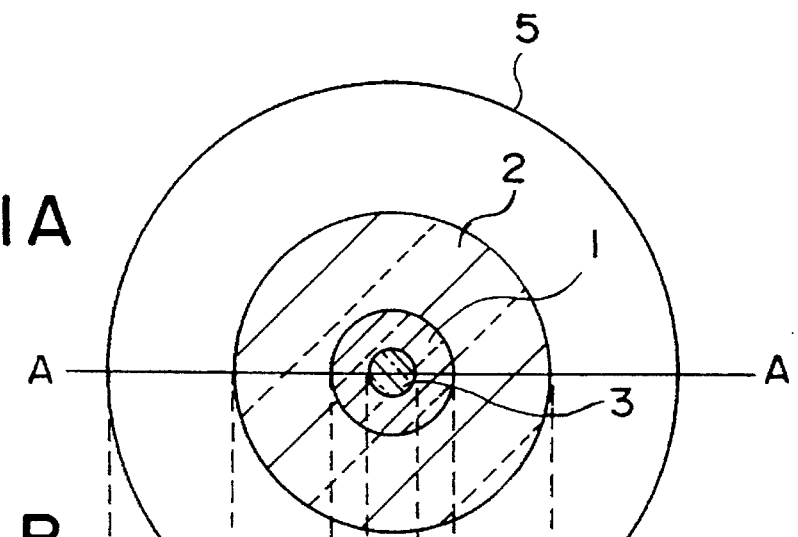
Fig. IA
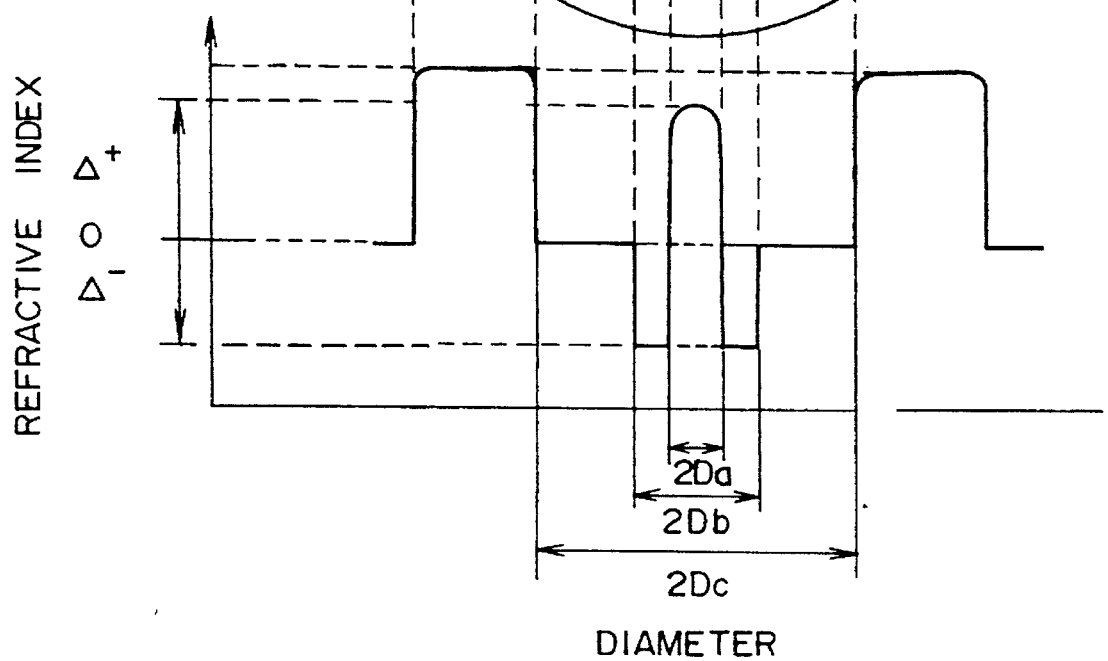
Fig. IB

Fig. 7A
Fig. 7B
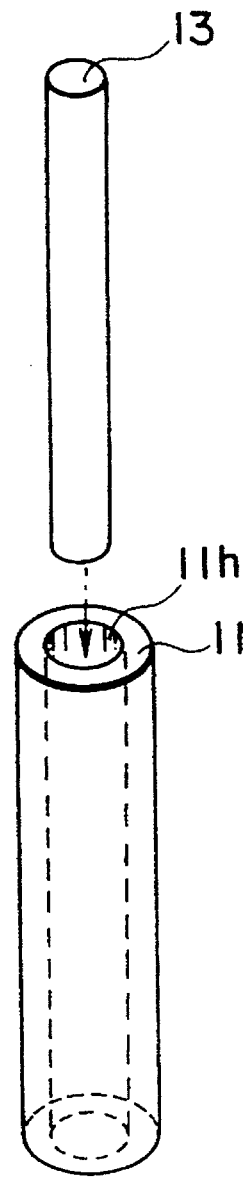
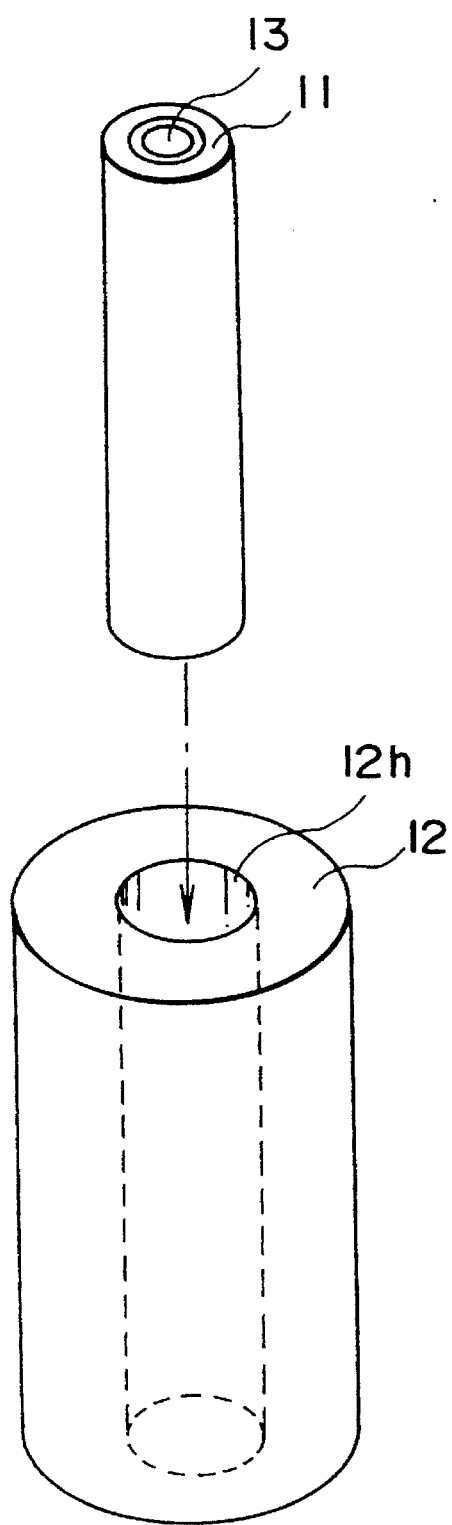

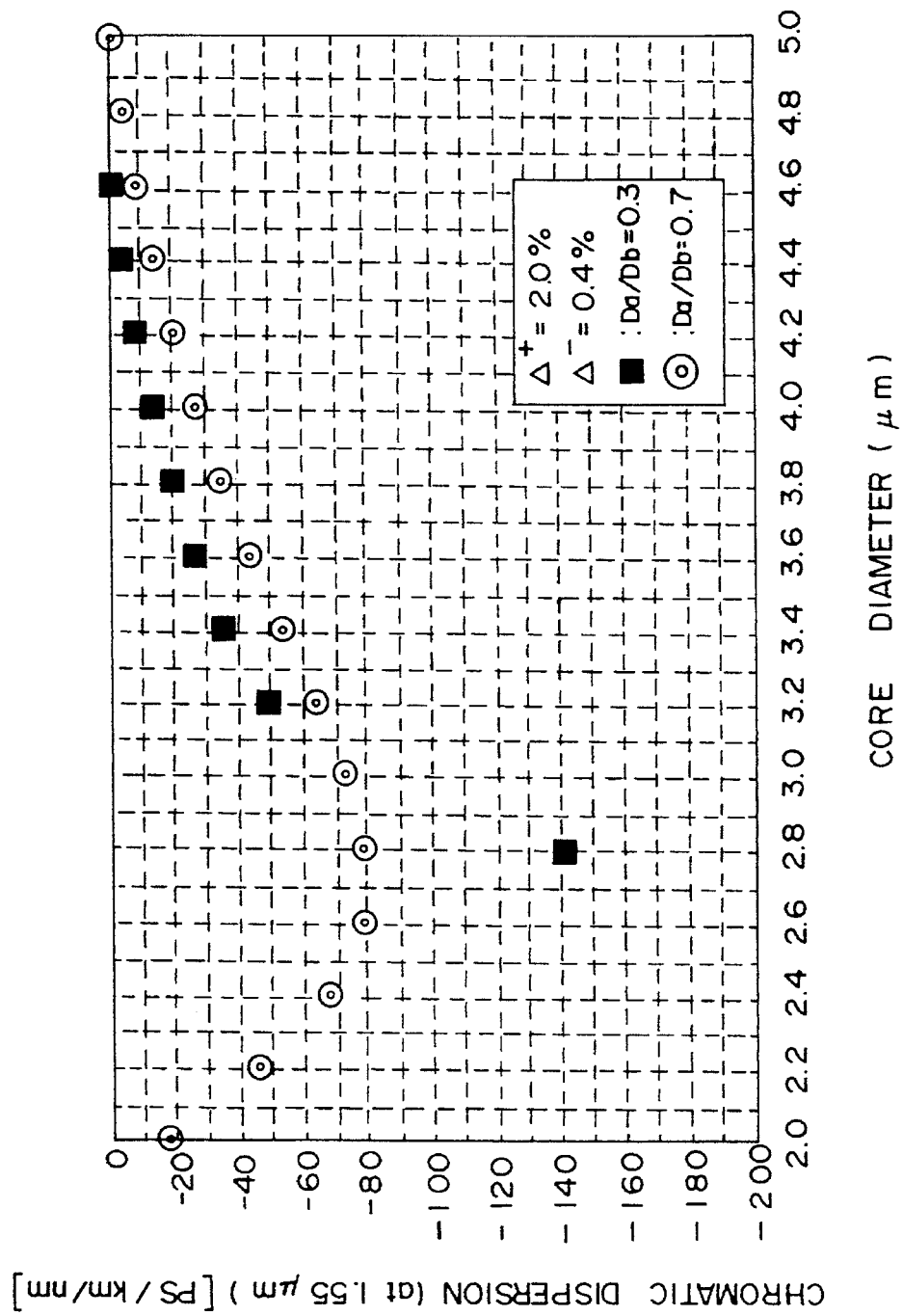

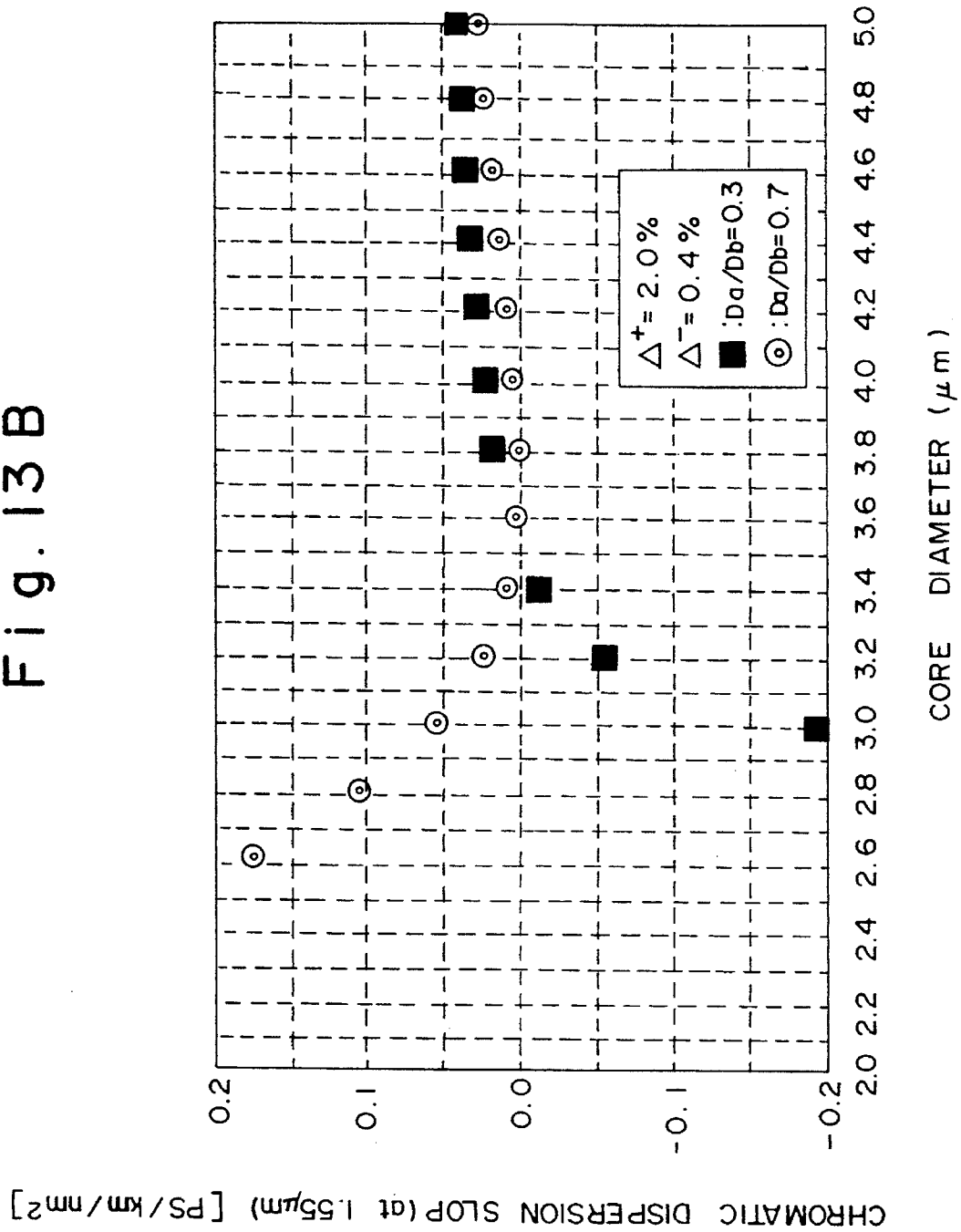

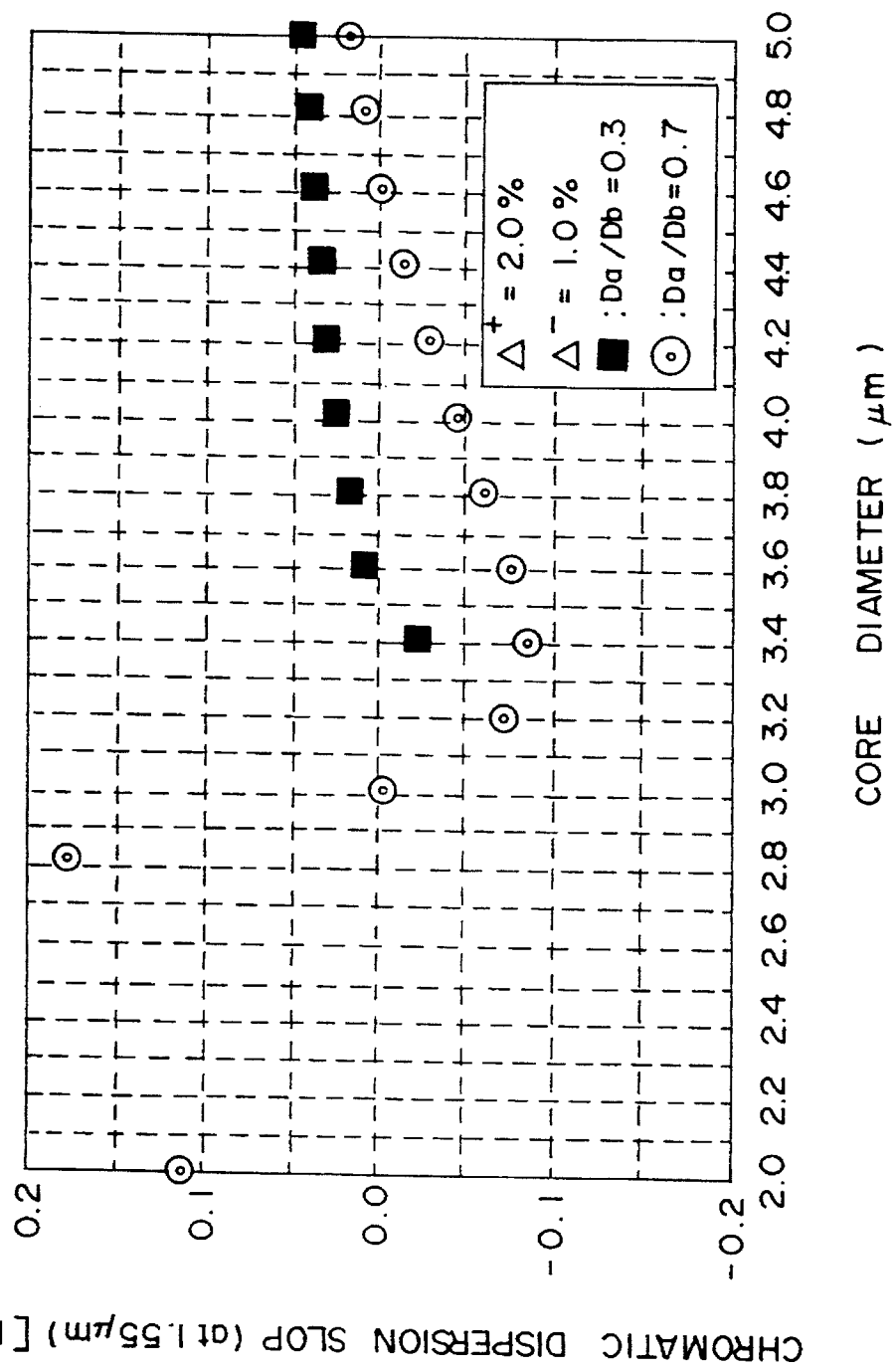

OPTICAL TRANSMISSION SYSTEM WITH DISPERSION COMPENSATING OPTICAL FIBER

This application is a continuation of application Ser. No. 08/408,620 filed on Mar. 23, 1995, now abandoned.

BACKGROUND OF THE INVENTION

1. Field of the Invention

The present invention relates to an optical transmission system including a dispersion compensating optical fiber.

2. Related Background Art

A dispersion compensating optical fiber is known as a fiber for compensating for chromatic dispersion of signal light. The dispersion compensating optical fiber is described for example in Japanese Laid-open Patent Application No. 6-222235.

SUMMARY OF THE INVENTION

When signal light with wavelengths in the 1.55 μm band is transmitted through a system for transmitting signal light with wavelengths in the 1.3 μm band, the signal light with wavelengths in the 1.55 μm is dispersed in propagation speed against the wavelengths. The dispersion compensating optical fiber (DCF) was proposed as a fiber for compensating for this chromatic dispersion.

In the transmission system using the dispersion compensating fiber, the overall chromatic dispersion of the transmission system as a whole is preferred to be as close to zero as possible around the wavelength 1.55 μm. Then, a chromatic dispersion slope of the dispersion compensating fiber is preferably to be negative around the wavelength 1.55 μm and in addition, is preferably to be equal in magnitude to a chromatic dispersion slope at 1.55 μm of the 1.3 μm band zero-dispersion fiber.

Heretofore, there was no dispersion compensating optical fiber that had a negative chromatic dispersion slope, that had a chromatic dispersion value suitable for practical application, and that had a bending loss to a bending diameter of 40 mm being smaller than 0.01 dB/m. Thus, when the dispersion compensating fiber was spooled on a small bobbin, this fiber was not able to be used in the optical transmission system. A dispersion compensating optical fiber according to the present invention is lowered in the bending loss thereof, whereby satisfactory chromatic dispersion can be effected as the fiber is set on the compact bobbin.

In order to lower the bending loss, a greater refractive index difference is preferred between a core and a cladding. However, doping the core with a high concentration of $GeO_2$ increases scattering losses caused by defects related to Ge, thereby increasing the transmission loss.

The dispersion compensating fiber of the present invention has a lower bending loss than those of conventional dispersion compensating fibers, and a negative chromatic dispersion slope. In detail, a bending loss $L_{bend}$ of the dispersion compensating fiber at the wavelength 1.55 μm with the bending diameter 2R being 40 mm is practically to be not more than 0.01 dB/m, and a bending loss $L_{bend}$ of the dispersion compensating fiber at the wavelength 1.55 μm with the bending diameter 2R being 80 mm is to be not more than 0.000001 dB/m. Further, a bending loss $L_{bend}$ of the dispersion compensating fiber at the wavelength 1.55 μm with the bending diameter 2R being 20 mm is to be not more than 1 dB/m.

The dispersion compensating fiber of the present invention is directed to a dispersion compensating fiber comprising a core, a first cladding surrounding the core, a second cladding surrounding the first cladding, and a resin coat surrounding the second cladding. The refractive index of the second cladding is lower than that of the core but higher than that of the first cladding. When the refractive index of the core is nc, that of the first cladding n1, and that of the second cladding n2, the following relationship holds between the refractive indices: that is, n1<n2<nc.

This dispersion compensating fiber is a "double-cladding" fiber. The double-cladding fiber has only one interface between two claddings. Because of this singularity of interface, the double-cladding fiber is superior to a triple-cladding fiber with two interfaces in respect of the transmission loss due to presence of interface.

A core diameter (2Da) is greater than 3 μm but smaller than 4 μm. A ratio (Da/Db) of the core diameter (2Da) to an outer diameter of the first cladding (2Db) is between 0.4 and 0.6. A relative refractive index difference of the core to the second cladding, (nc−n2)/n2, is larger than 0.02 but smaller than 0.03. A relative refractive index difference of the first cladding to the second cladding, (n2−n1)/n2, is larger than 0.004 but smaller than 0.01. This dispersion compensating optical fiber has a sufficiently negative chromatic dispersion slope at wavelengths (above 1.55 μm and below 1.65 μm both inclusive) around 1.55 μm, and with the bending diameter being 40 mm, the bending loss thereof at the wavelength 1.55 μm is smaller than 0.01 dB/m. Accordingly, the dispersion compensating fiber of the present invention assures sufficient dispersion compensation in spite of the compact configuration.

In other words, the present optical transmission system comprises a light source; a single-mode optical fiber having zero dispersion at a predetermined wavelength (1310 nm) between 1290 nm and 1330 nm, which is connected to the light source; an erbium-doped fiber connected to the single-mode optical fiber; a bobbin having a diameter between 40 mm and 80 mm both inclusive; and a dispersion compensating fiber connected to the erbium-doped fiber and wound around the bobbin, in which a bending loss when wound around the bobbin is smaller than 0.01 dB/m at the wavelength 1.55 μm, which has a core, a first cladding surrounding the core, and a second cladding surrounding the first cladding, and which satisfies the following relations:

n1<n2<nc,

3 μm<2Da<4 μm, 0.4<(Da/Db)<0.6, 0.02<(nc−n2)/n2<0.03, 0.004<(n2−n1)/n2<0.01, where nc is a refractive index of the core, n1 is a refractive index of the first cladding, n2 is a refractive index of the second cladding, 2Da is a diameter of the core, and 2Db is an outer diameter of the first cladding.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 1A is a cross section of a dispersion compensating optical fiber, and FIG. 1B a refractive index profile along the line A—A, of the fiber shown in FIG. 1A;

FIGS. 7A and 7B are drawings to illustrate a process for producing the fiber shown in FIG. 1A;

FIG. 13A shows a relation between the core diameter and the chromatic dispersion;

FIG. 13B shows a relation between the core diameter and the chromatic dispersion slope;

FIG. 14B shows a relation between the core diameter and the chromatic dispersion slope.

DESCRIPTION OF THE PREFERRED EMBODIMENTS

Figure 2A:
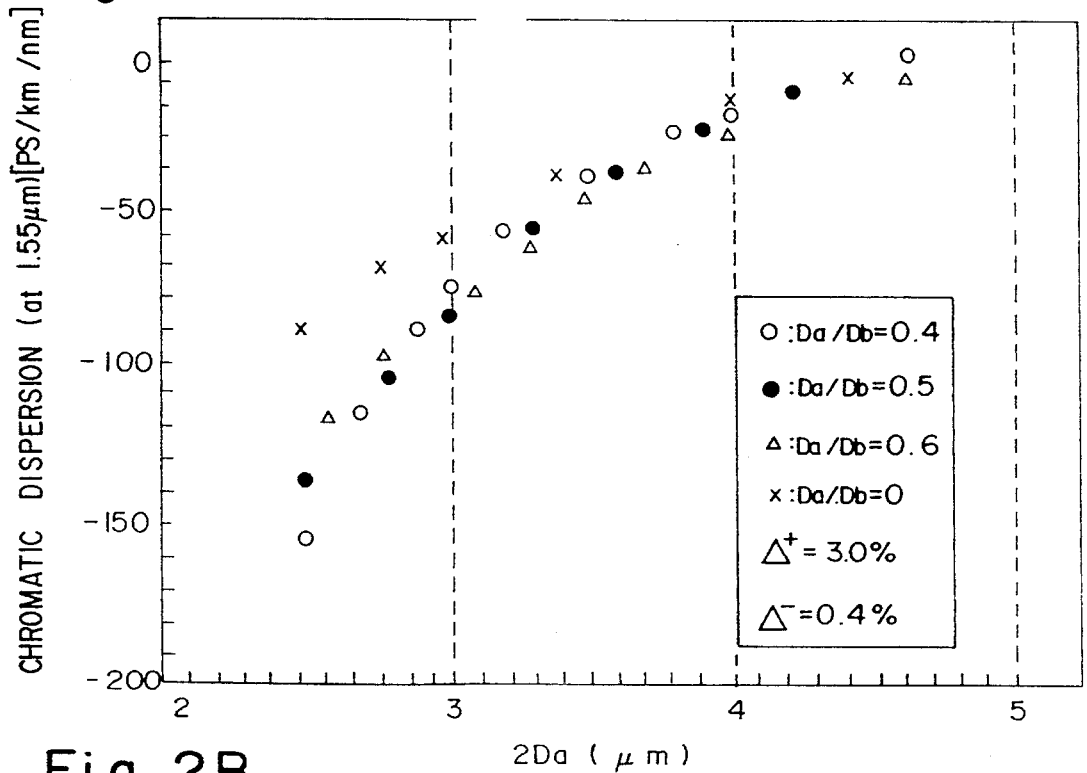
FIG. 2A shows a relation between the core diameter and the chromatic dispersion.

The process for producing the dispersion compensating optical fiber according to the present invention is described.

First described using FIGS. 7A and 7B is a process for producing a fiber preform.

First, a cylindrical rod for core 13 and a cylindrical rod for first cladding 11 are fabricated by the VAD method. The core rod 13 is silica glass doped with $GeO_2$. A doping amount of $GeO_2$ is adjusted so that the refractive index decreases in proportion to the second power to the fifth power of distance toward the periphery from the center. The refractive index in the core rod 13 may be arranged to decrease stepwise with an increase of distance away from the center. The first cladding rod 11 is silica glass uniformly doped with fluorine.

The first cladding rod 11 is perforated to form a hole 11$h$ for inserting the core rod 13 thereinto. Then the core rod 13 is inserted into the hole 11$h$.

Next, a cylindrical rod for second cladding 12 is fabricated by the VAD method. The second cladding rod 12 is pure silica glass. The second cladding rod 12 is perforated to form a hole 12$h$ for inserting the first cladding rod 11 thereinto. Then the first cladding rod 11 with the core rod 13 therein is inserted into the hole 12$h$, and the combination is heated to complete a preform PF.

Figure 8:
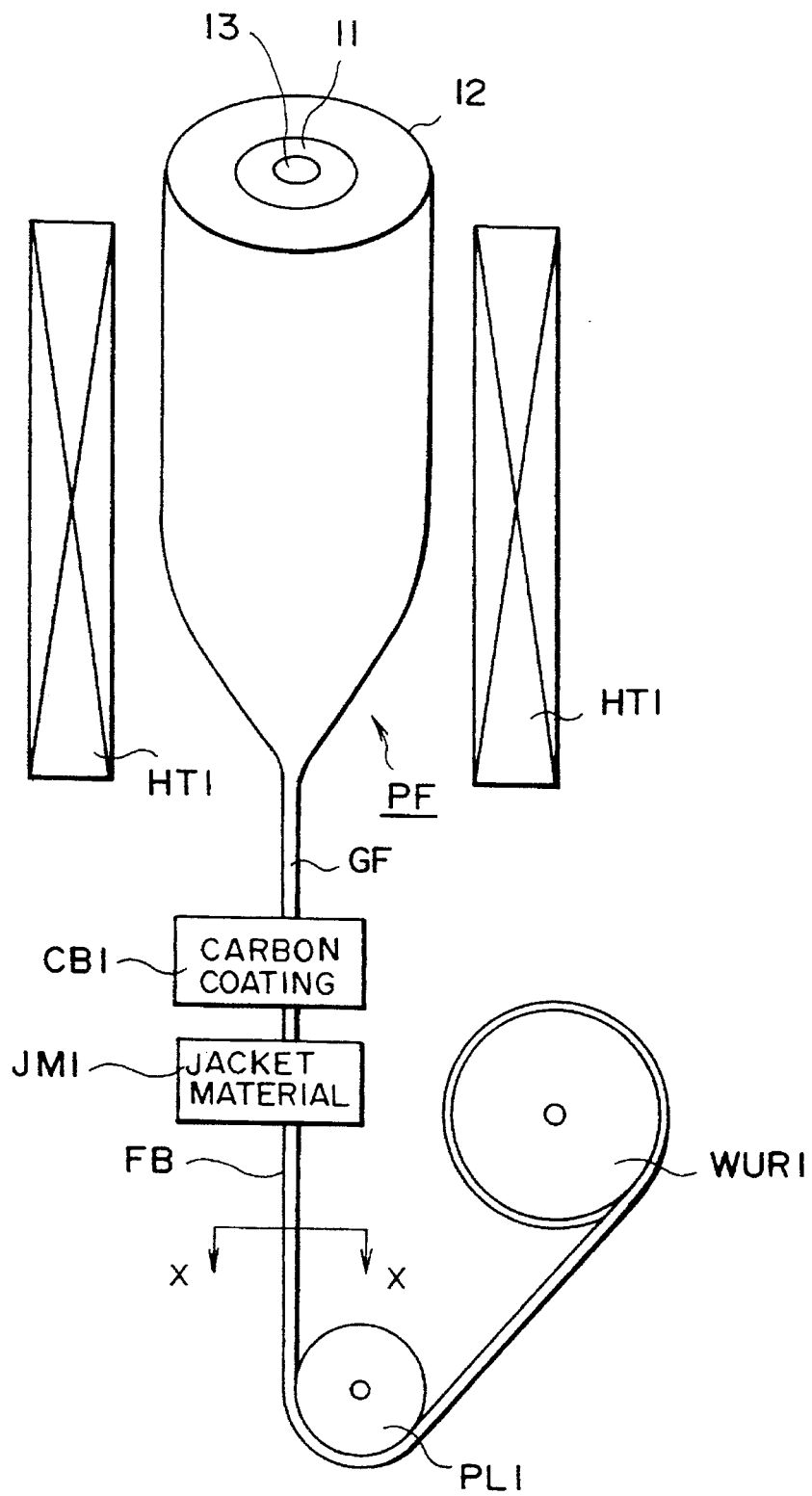
FIG. 8 is a drawing to illustrate a method for drawing a fiber preform.
Figure 9A:
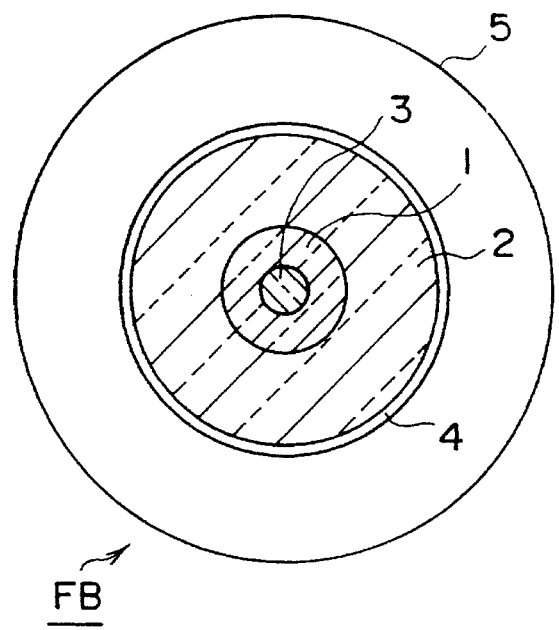
FIG. 9A is a cross section of the dispersion compensating fiber shown in FIG. 8, cut along X—X.

This preform PF is drawn using the apparatus shown in FIG. 8 to produce a fiber FB. One end of the preform PF is heated by a heater HT1, so that the one end is fused. The fused one end of preform PF is cooled to yield an optical fiber. The optical fiber is wound around a take-up reel (bobbin) WUR1 via a pulley PL1. A glass fiber drawn from the preform PF is coated with a carbon film 4 by a carbon coat apparatus CB1. The carbon film 4 is coated with a jacket material (resin film) 5. The optical fiber shown in FIG. 9A is the optical fiber FB rolled around the take-up reel WUR1 in FIG. 8. The refractive index of the resin film 5 is higher than that of the second cladding.

Figure 6:
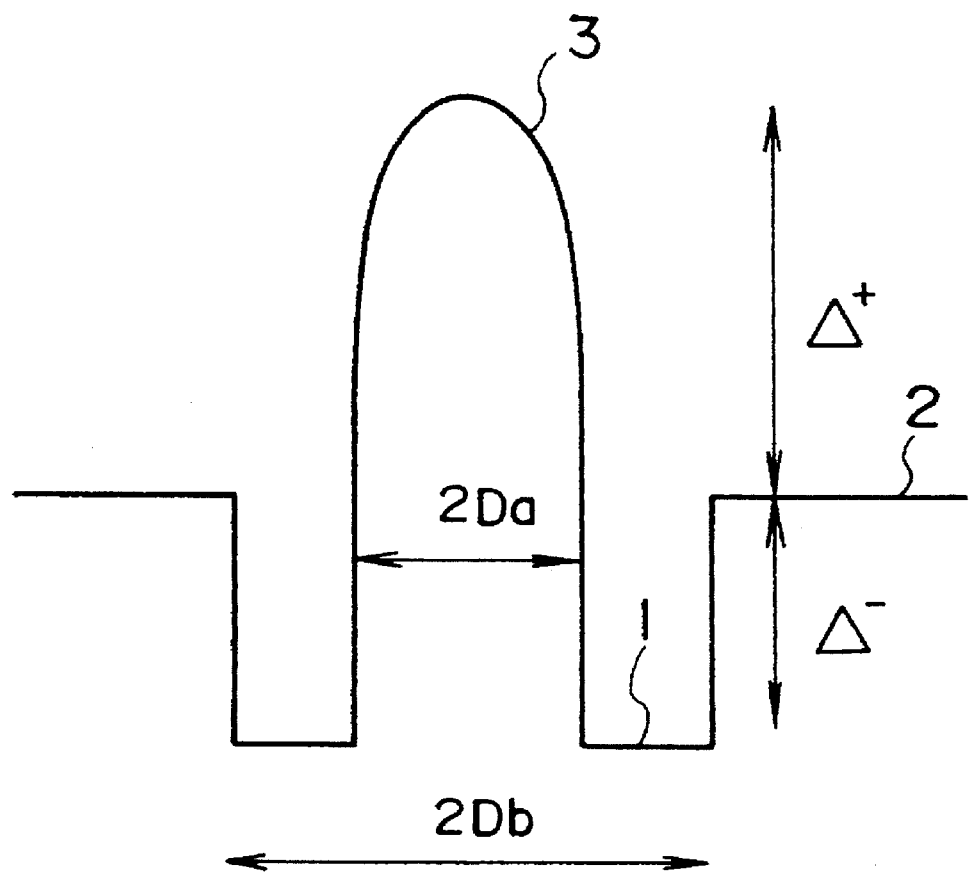
FIG. 6 shows a refractive index profile in fiber.
Figure 9B:
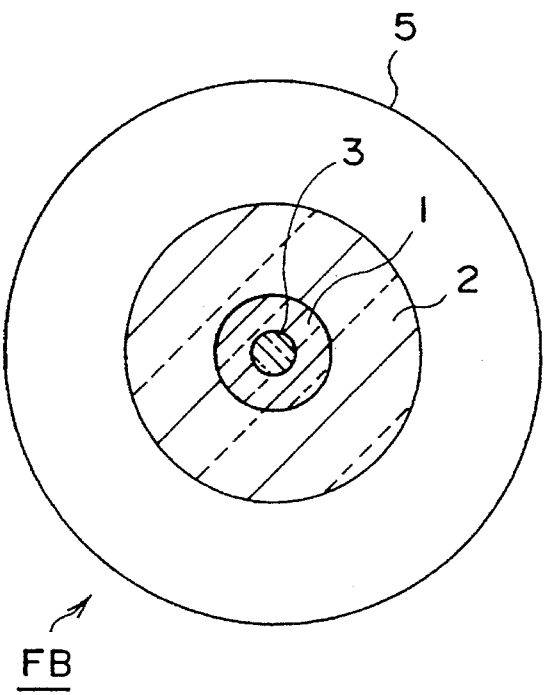
FIG. 9B shows a dispersion compensating fiber without a carbon coat.

The optical fiber shown in FIG. 9A is next described. This dispersion compensating fiber is a "double-cladding" fiber. This dispersion compensating optical fiber is provided with the core 3, the first cladding 1 surrounding the core 3, the second cladding 2 surrounding the first cladding 1, the carbon coating 4, and the resin coat 5 surrounding the second cladding 2. Further, FIG. 9B shows another dispersion compensating optical fiber without the carbon film 4. The dispersion compensating fiber shown in FIG. 1A is the dispersion compensating optical fiber shown in FIG. 9B. FIG. 1B and FIG. 6 show a refractive index profile in this optical fiber.

The refractive index of the second cladding 2 is lower than that of the core but higher than that of the first cladding. When the refractive index of the core 3 is nc, that of the first cladding 1 n1, and that of the second cladding 2 n2, the following relation holds between these refractive indices. That is, n1<n2<nc. The refractive index n5 of the resin 5 is higher than that of the second cladding 2 and higher than that of the core 3.

The diameter (2Da) of the core 3 is larger than 3 μm but smaller than 4 μm. The ratio (Da/Db) of the diameter (2Da) of the core 3 to the outer diameter (2Db) of the first cladding 1 is between 0.4 and 0.6. A relative refractive index difference of the core 3 to the second cladding 2, $\Delta^+=(nc-n2)/n2$, is larger than 0.02 but smaller than 0.03. A relative refractive index difference of the first cladding 1 to the second cladding 2, $\Delta^-=(n2-n1)/n2$, is larger than 0.004 but smaller than 0.01. Further, the bending loss $L_{bend}$ of this fiber at the wavelength 1.55 μm with the bending diameter 2R (where R is a radius of curvature of dispersion compensating fiber) being lower than 40 mm is below 0.01 dB/m. The outer diameter (2Dc) of the second cladding 2 is 125 μm. The diameter (2Da) of the core 3 in the dispersion compensating fiber is between 2.4% and 3.2% both inclusive of 2Dc. This is smaller than the core diameter of conventional single-mode fiber (10% of 2Dc).

In summary, the dispersion compensating fiber of the present embodiment has the following relations:

n1<n2<nc<n5,

3 µm<2Da<4 µm, 0.4<(Da/Db)<0.6, $0.02<\Delta^+=(nc-n2)/n2<0.03$, $0.004<\Delta^-=(n2-n1)/n2<0.01$, 40 mm≦2R≦80 mm, $L_{bend}$<0.01 dB/m (2R=40 mm), $L_{bend}$<0.000001 dB/m (2R=80 mm).

Figure 10:
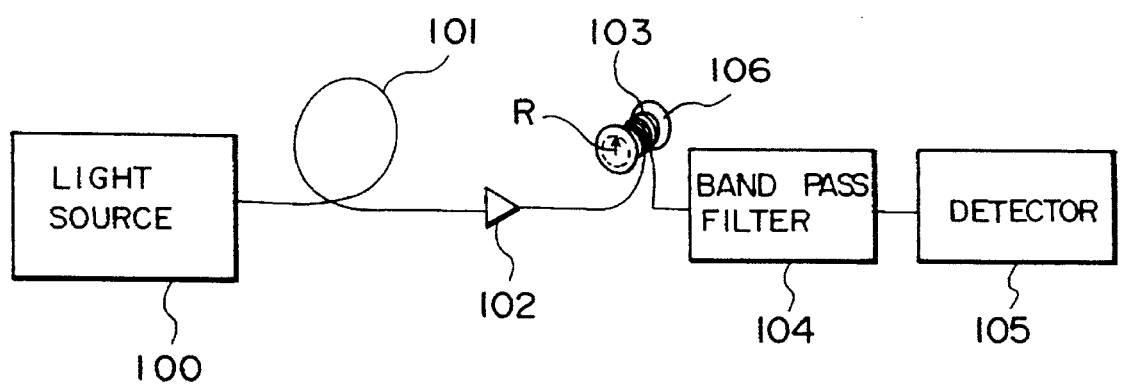
FIG. 10 shows a system using the dispersion compensating fiber.

Now, the characteristics of the dispersion compensating optical fiber according to the present embodiment are described. FIG. 10 shows an optical transmission system using the above dispersion compensating fiber. This system is provided with a light source 100, a transmission link 101 for connecting the light source to a fiber amplifier 102, a dispersion compensating fiber 103 connected to the erbium-doped fiber 102 and wound around a bobbin 106, a band-pass filter 104 connected to the dispersion compensating fiber 103, and a detector 105 connected to the band-pass filter 104. The transmission link 101 is a single-mode optical fiber 101 having zero dispersion at a predetermined wavelength between 1290 nm and 1330 nm, for example at 1310 nm. The radius of curvature R of the dispersion compensating fiber 103 thus wound is between 20 mm and 40 mm both inclusive. Accordingly, the bending diameter 2R is between 40 mm and 80 mm both inclusive. The elements other than the dispersion compensating fiber in this system are described in European Laid-open Patent Application No. 0554714A1.

FIG. 2A to FIG. 5B show relationships between the diameter 2Da of the core 3 of the above dispersion compensating optical fiber and the characteristics of the fiber.

Figure 2B:
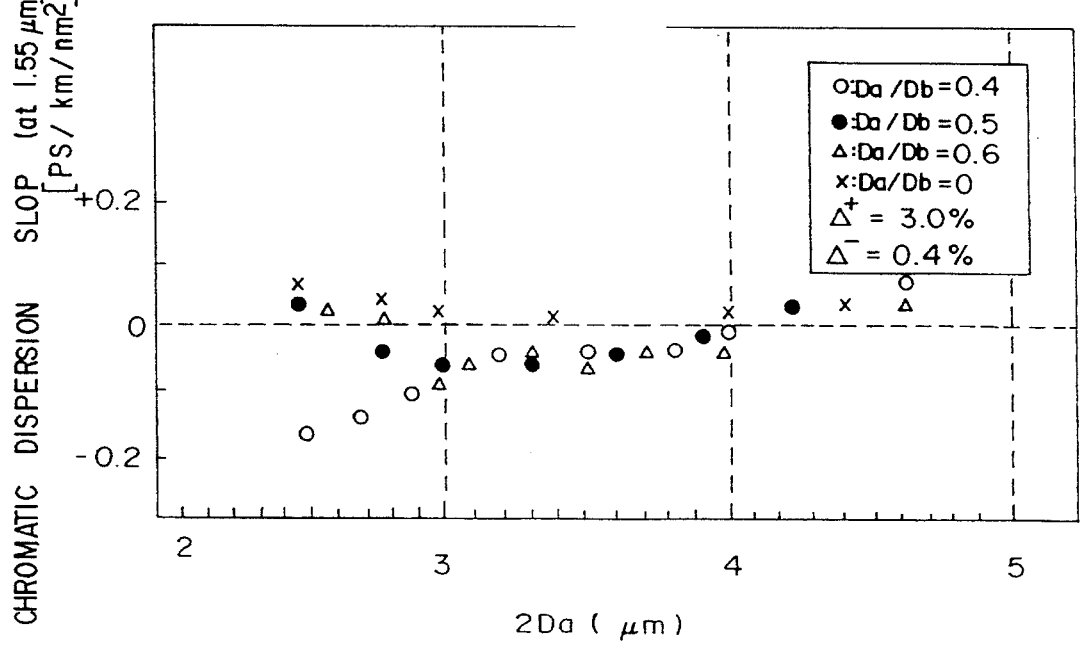
FIG. 2B shows a relation between the core diameter and the chromatic dispersion slope.

FIG. 2A shows a relation between the diameter 2Da of the core 3 and the chromatic dispersion (ps/nm/km) with a parameter of the ratio (Da/Db) of the diameter 2Da of the core 3 to the outer diameter 2Db of the first cladding 1. FIG. 2B shows a relation between the diameter 2Da of the core 3 and the chromatic dispersion slope (ps/km/nm²) with the parameter of the ratio (Da/Db) of the diameter 2Da of the core 3 to the outer diameter 2Db of the first cladding 1. Here, the relative index difference $\Delta^+$ of the core 3 is 3.0%, while the relative index difference $\Delta^-$ of the first cladding 1 is 0.4%.

Practically, the chromatic dispersion of dispersion compensating fiber is desired to be not more than −70 ps/nm/km, and more preferably, not more than −90 ps/nm/km. Also, the chromatic dispersion slope (ps/km/nm²) is defined as a slope of wavelength characteristic of dispersion of signal light passing in the dispersion compensating fiber. This chromatic dispersion slope is preferably to be negative. In order to fabricate a compact optical element, it is necessary for the dispersion compensating fiber to be wound around a bobbin or the like. Thus, the bending loss $L_{bend}$ of the dispersion compensating fiber at the wavelength 1.55 µm with the bending diameter 2R of dispersion compensating fiber being 40 mm is practically not more than 0.01 dB/m, and the bending loss $L_{bend}$ of the dispersion compensating fiber at the wavelength 1.55 µm with the bending diameter 2R being 80 mm is preferably to be not more than 0.000001 dB/m. Further, the bending loss $L_{bend}$ of the dispersion compensating fiber at the wavelength 1.55 µm with the bending diameter 2R being 20 mm is preferably to be not more than 1 dB/m.

As apparent from FIG. 2B, the dispersion slope takes values between −0.1 and −0.01 (ps/km/nm²), if the diameter 2Da of the core 3 is larger than 3 µm and smaller than 4 µm and if the ratio (Da/Db) is between 0.4 and 0.6 both inclusive. Thus, the dispersion slope in this range takes negative values.

In this range, the chromatic dispersion is smaller than −20 (ps/nm/km) and larger than −85 (ps/nm/km).

Accordingly, if the diameter 2Da of the core 3 is larger than 3 µm but smaller than 4 µm, if the ratio (Da/Db) is between 0.4 and 0.6 both inclusive, if the relative index difference $\Delta^+$ of the core 3 is 3.0%, and if the relative index difference $\Delta^-$ of the first cladding 1 is 0.4%, at least one dispersion compensating fiber can be fabricated with a chromatic dispersion of not more than −70 ps/nm/km and with a negative dispersion slope (ps/km/nm²). When the bending diameter 2R of the dispersion compensating fiber is 40 mm, the bending loss $L_{bend}$ of the dispersion compensating fiber at the wavelength 1.55 µm is not more than 0.01 dB/m, and the bending loss $L_{bend}$ of the dispersion compensating fiber at the wavelength 1.55 µm with the bending diameter 2R being 80 mm is not more than 0.000001 dB/m.

When the ratio (Da/Db) is 0, that is, when the dispersion compensating fiber excludes the first cladding 1, the slope is always positive. Thus, dispersion compensating fibers without the first cladding 1 are not effective to compensate for the chromatic dispersion in a wide wavelength region.

Figure 11A:
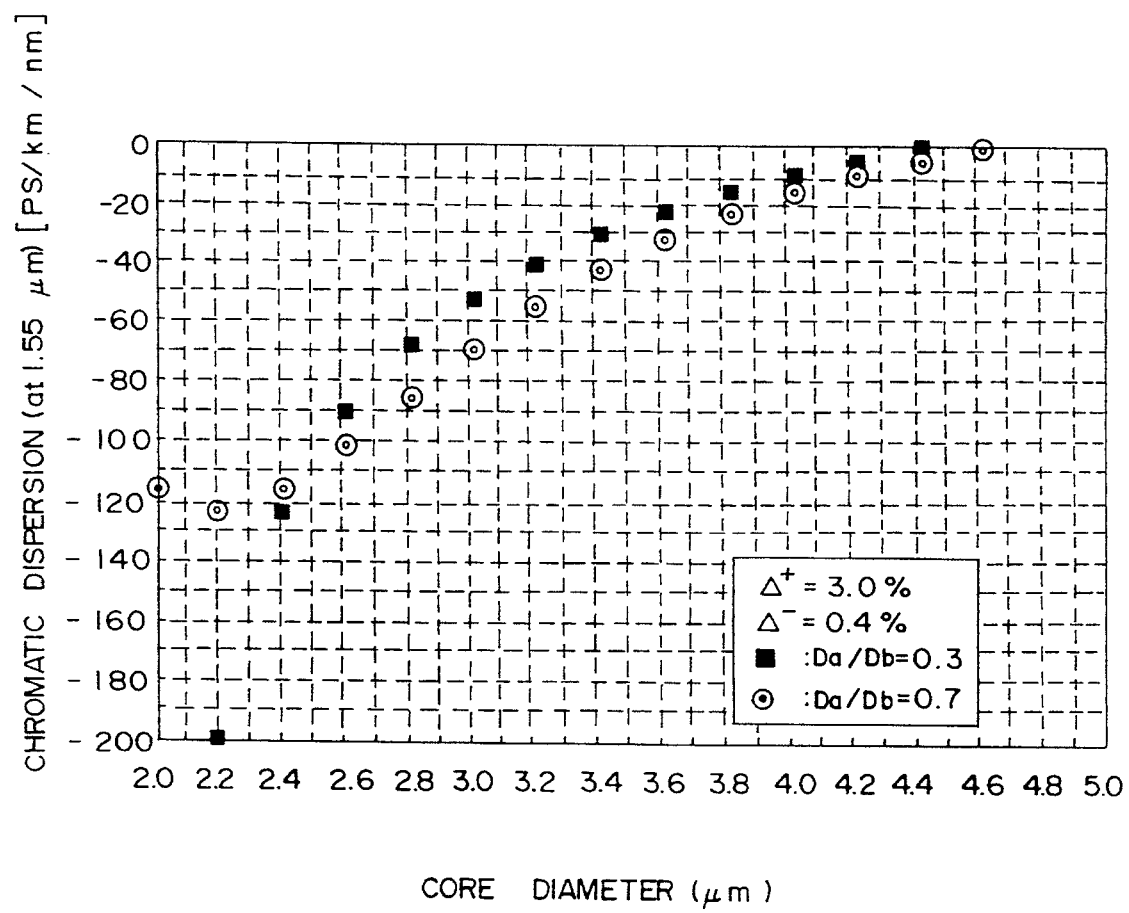
FIG. 11A shows a relation between the core diameter and the chromatic dispersion.
Figure 11B:
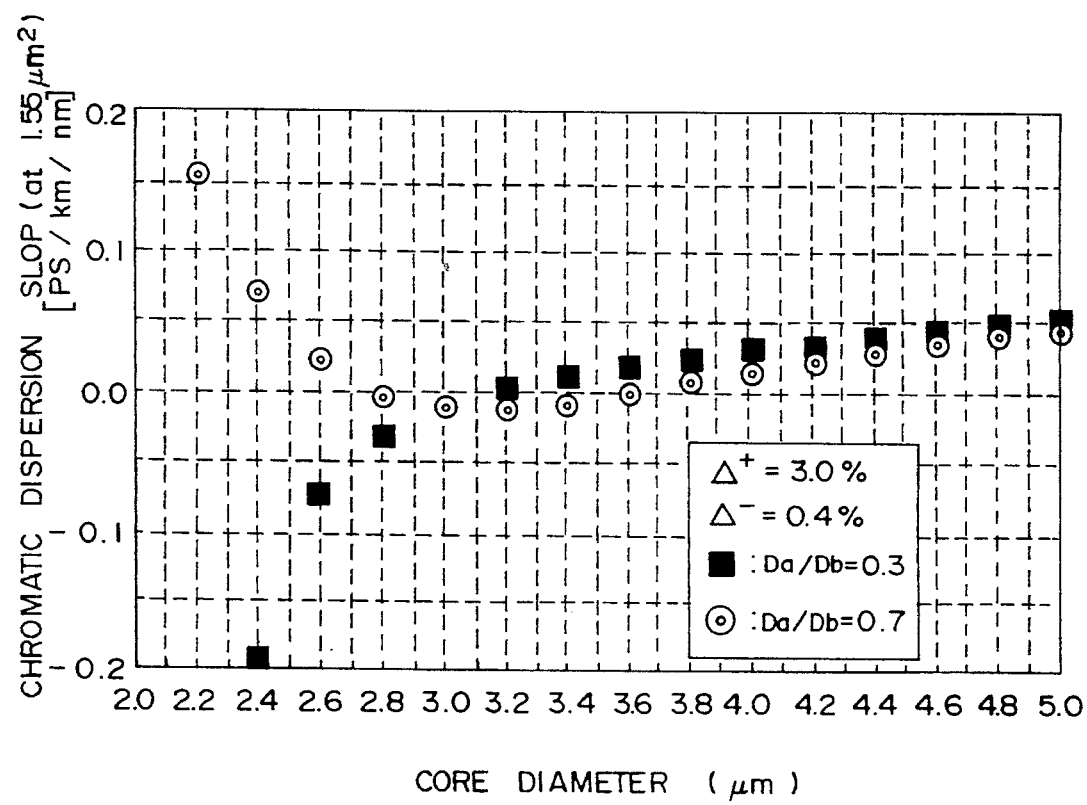
FIG. 11B shows a relation between the core diameter and the chromatic dispersion slope.

As a comparative example, FIG. 11A and FIG. 11B show relations of the chromatic dispersion and dispersion slope, respectively, to the diameter 2Da of the core 3 with the ratio (Da/Db) being 0.3 and 0.7. Here, the relative index difference $\Delta^+$ of the core 3 is 3.0% and the relative index difference $\Delta^-$ of the first cladding 1 is 0.4%.

As apparent from FIG. 11B, if the diameter 2Da of the core 3 is larger than 3 µm but smaller than 4 µm and if the ratio (Da/Db) is 0.3, the dispersion slope is positive and this dispersion compensating fiber cannot demonstrate sufficient dispersion compensation.

If the diameter 2Da of the core 3 is larger than 3.4 µm and if the ratio (Da/Db) is 0.7, the dispersion slope takes positive values, so that sufficient dispersion compensation cannot be expected.

If the diameter 2Da of the core 3 is smaller than 3.4 µm but larger than 2.8 µm and if the ratio (Da/Db) is 0.7, the dispersion slope takes negative values. The chromatic dispersion in this case, however, is larger than −70 (ps/nm/km), thus failing to achieve sufficient dispersion values.

In addition, these fibers show that when the diameter 2Da of core is not more than 2.2 µm, the bending losses $L_{bend}$ of the fibers at the wavelength 1.55 µm with the bending diameter 2R (where R is a radius of curvature of dispersion compensating fiber) being between 40 mm and 80 mm both inclusive are greater than 0.01 dB/m, and therefore, a compact optical element using a dispersion compensating fiber cannot be fabricated from the dispersion compensating fibers.

Figure 3A:
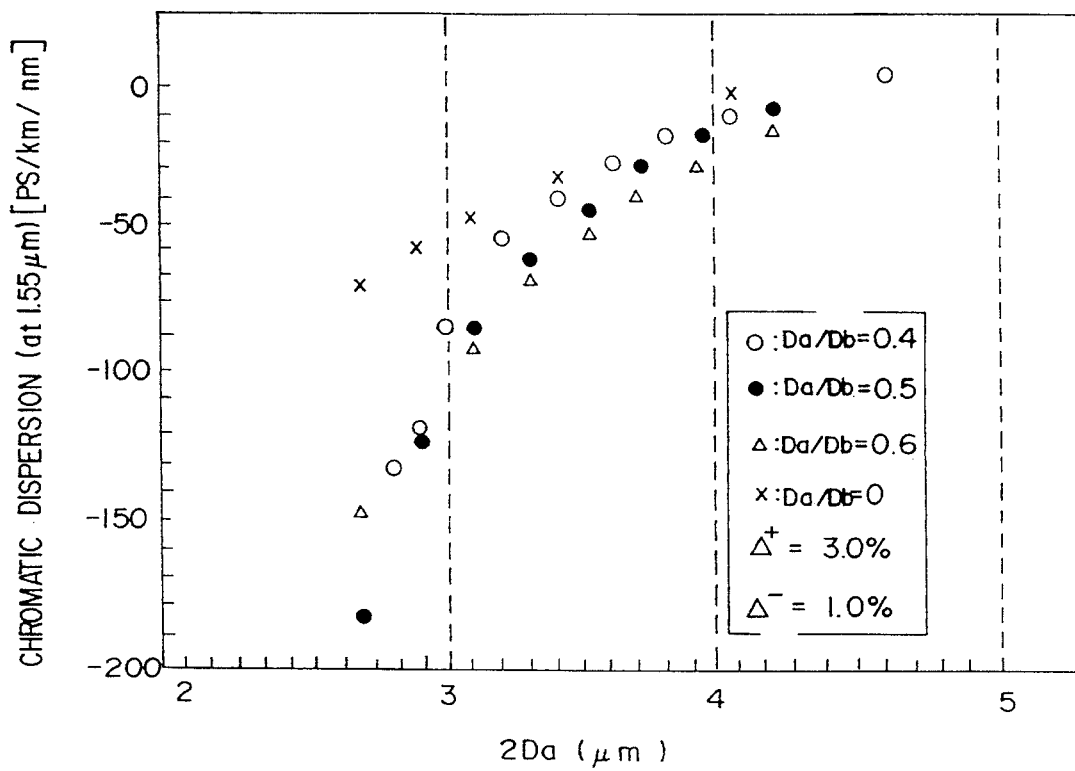
FIG. 3A shows a relation between the core diameter and the chromatic dispersion.
Figure 3B:
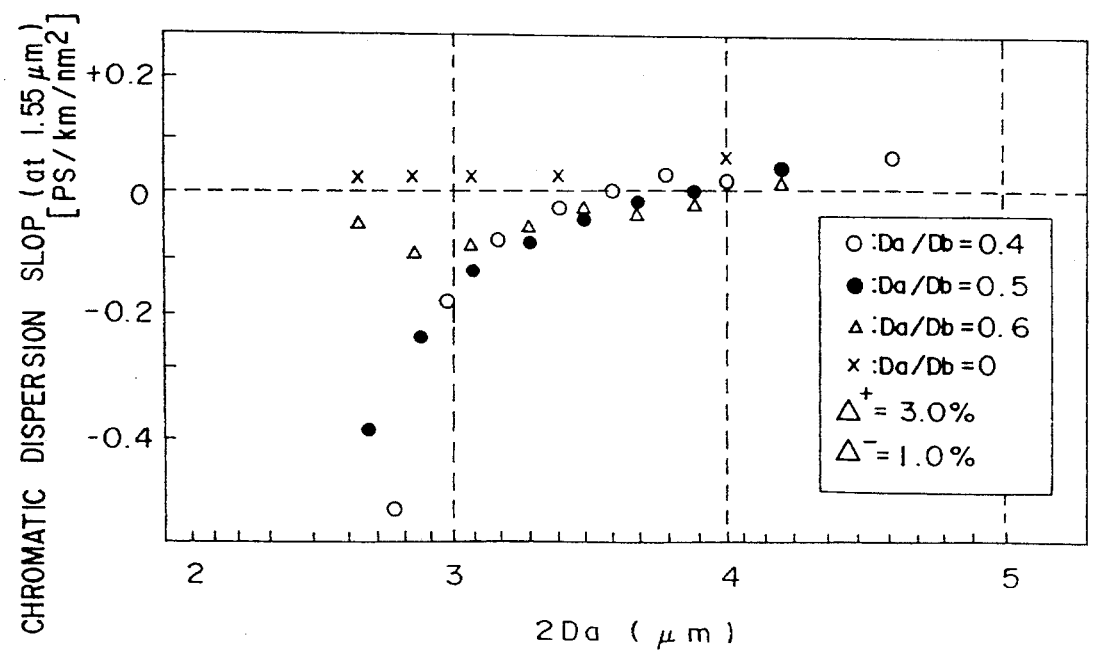
FIG. 3B shows a relation between the core diameter and the chromatic dispersion slope.

FIG. 3A shows a relation between the diameter 2Da of the core 3 and the chromatic dispersion (ps/nm/km) with the parameter of the ratio (Da/Db) of the diameter 2Da of the core 3 to the outer diameter 2Db of the first cladding 1. FIG. 3B shows a relation between the diameter 2Da of the core 3 and the dispersion slope (ps/km/nm$^2$) with the parameter of the ratio (Da/Db) of the diameter 2Da of the core 3 to the outer diameter 2Db of the first cladding 1. Here, the relative index difference $\Delta^+$ of the core 3 is 3.0%, while the relative index difference $\Delta^-$ of the first cladding 1 is 1.0%.

As apparent from FIG. 3B, if the outer diameter 2Da of the core 3 is larger than 3 μm but smaller than 4 μm and if the ratio (Da/Db) is between 0.4 and 0.6 both inclusive, most (60 or more %) values of the dispersion slope are negative and the chromatic dispersion is smaller than −20 (ps/nm/km) and larger than −85 (ps/nm/km).

Thus, if the diameter 2Da of the core 3 is larger than 3 μm but smaller than 4 μm, if the ratio (Da/Db) is between 0.4 and 0.6 both inclusive, if the relative index difference $\Delta^+$ of the core 3 is 3.0%, and if the relative index difference $\Delta^-$ of the first cladding 1 is 1.0%, at least one dispersion compensating fiber can be fabricated with a chromatic dispersion of not more than −70 (ps/nm/km) and with a negative dispersion slope (ps/km/nm$^2$).

The bending loss $L_{bend}$ of the dispersion compensating fiber at the wavelength 1.55 μm with the bending diameter 2R of the dispersion compensating fiber being 40 mm is not more than 0.01 dB/m, and the bending loss $L_{bend}$ of the dispersion compensating fiber at the wavelength 1.55 μm with the bending diameter 2R being 80 mm is not more than 0.000001 dB/m.

In summary, the dispersion compensating fiber shows that the bending loss $L_{bend}$ of the fiber at the wavelength 1.55 μm with the bending diameter 2R (where R is a radius of curvature of dispersion compensating fiber) being between 40 mm and 80 mm both inclusive is less than 0.01 dB/m, and therefore, by bending the dispersion compensating fiber, a compact element using the dispersion compensating fiber can be fabricated.

When the ratio (Da/Db) is 0, that is, when the dispersion compensating fiber excludes the first cladding 1, the slope always takes positive values, so that dispersion compensating fibers without the first cladding 1 would fail to compensate for the chromatic dispersion in a wide wavelength region.

Figure 12A:
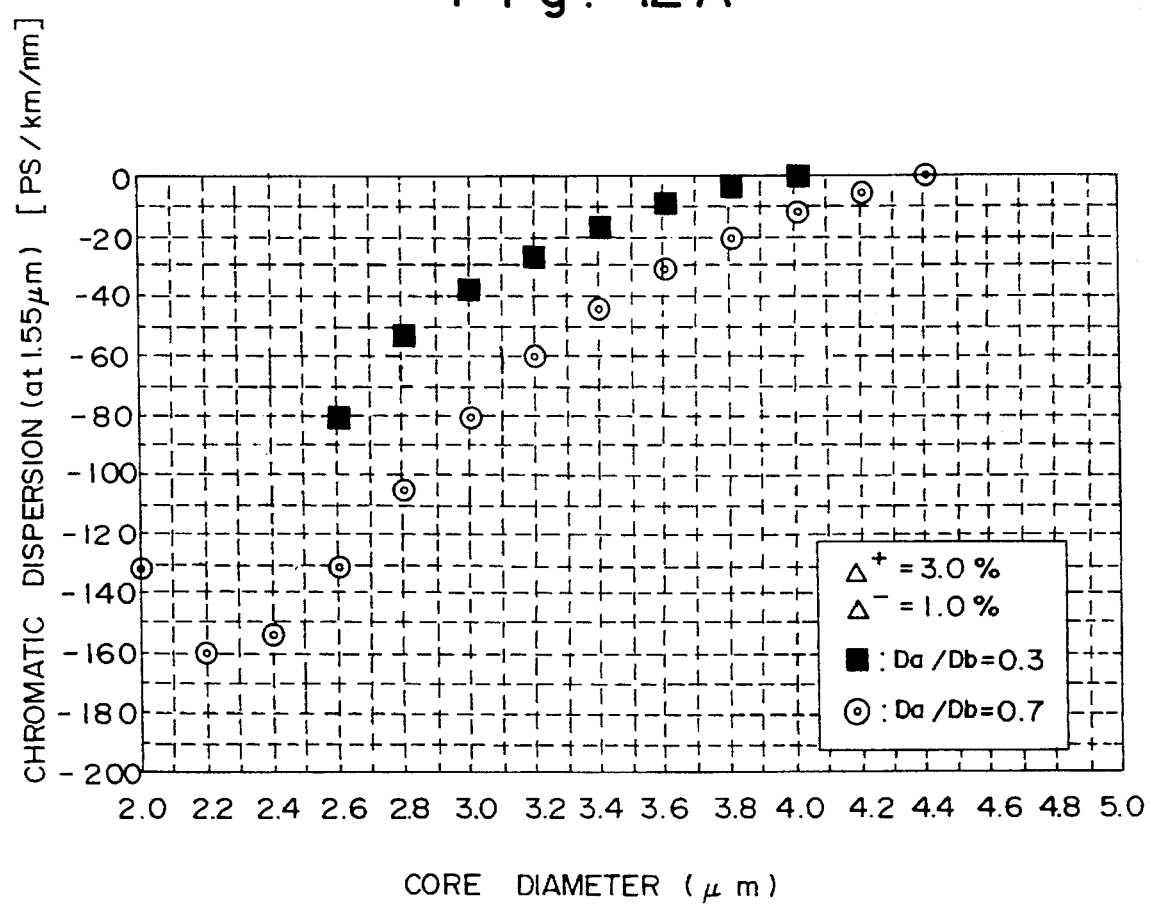
FIG. 12A shows a relation between the core diameter and the chromatic dispersion.
Figure 12B:
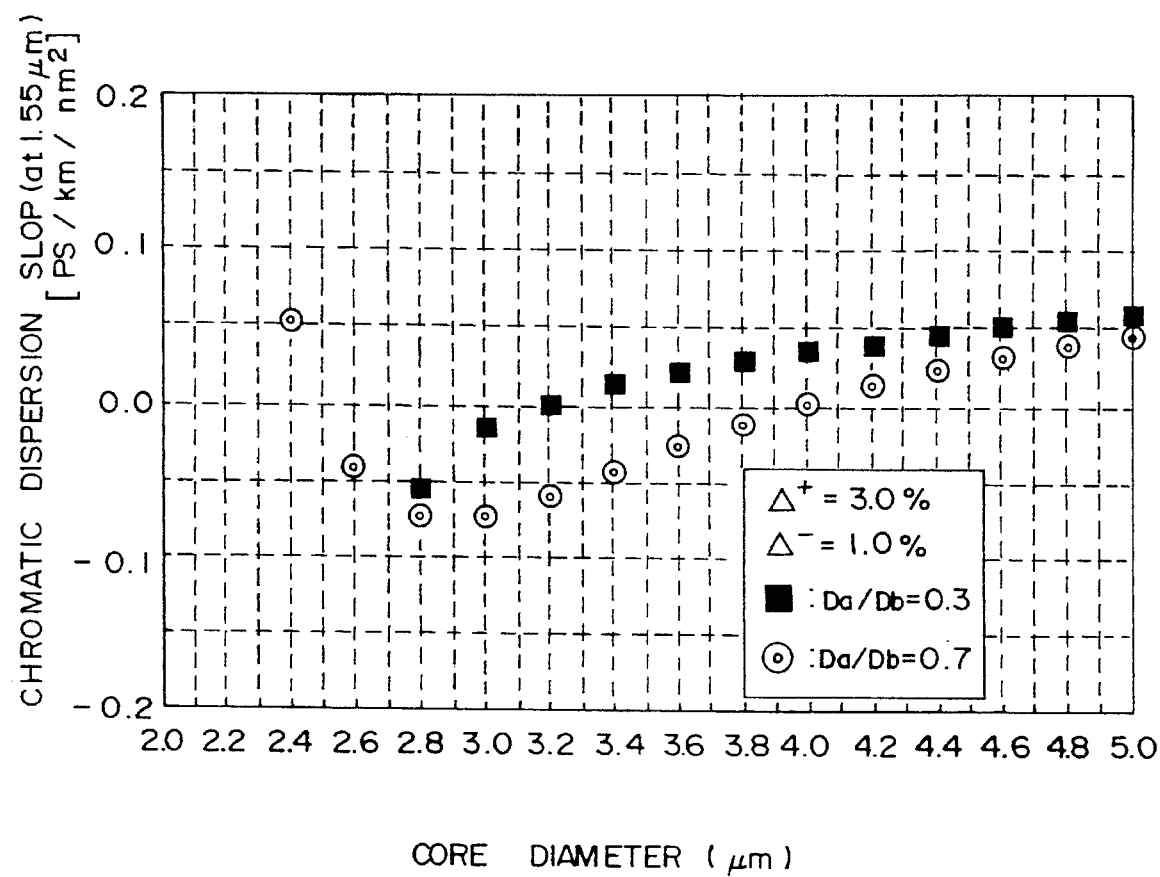
FIG. 12B shows a relation between the core diameter and the chromatic dispersion slope.

As a comparative example, FIG. 12A and FIG. 12B show relations of the chromatic dispersion and dispersion slope, respectively, at the wavelength 1.55 μm to the diameter 2Da of the core 3 with the ratio (Da/Db) being 0.3 and 0.7. Here, the relative index difference $\Delta^+$ of the core 3 is 3.0% and the relative index difference $\Delta^-$ of the first cladding 1 is 1.0%.

As apparent from FIG. 12B, if the diameter 2Da of the core 3 is larger than 3.2 μm but smaller than 4 μm and if the ratio (Da/Db) is 0.3, the dispersion slope takes positive values and therefore, dispersion compensating fibers therein would fail to demonstrate sufficient dispersion compensation. If the diameter 2Da of the core 3 is smaller than 3.0 μm but larger than 2.6 μm and if the ratio (Da/Db) is 0.3, the dispersion slope takes negative values but the chromatic dispersion is larger than −70 (ps/km/nm). Thus, dispersion compensating fibers therein would fail to show sufficient dispersion compensation. If the diameter 2Da of the core 3 is not more than 2.6 μm and if the ratio (Da/Db) is 0.3, the dispersion slope takes negative values and the chromatic dispersion is −70 (ps/km/nm). However, the bending loss of light at the wavelength 1.55 μm with the bending diameter of 20 mm is not less than 1 dB/m. Thus, dispersion compensating fibers therein are not suitable for practical application.

If the diameter 2Da of the core 3 is smaller than 3.8 μm but larger than 3.0 μm and if the ratio (Da/Db) is 0.7, the dispersion slope takes negative values. However, the chromatic dispersion in this case is larger than −70 (ps/km/nm), and therefore, dispersion compensating fibers therein cannot demonstrate sufficient dispersion compensation. Further, if the diameter 2Da of the core 3 is not more than 3.0 μm but larger than 2.8 μm and if the ratio (Da/Db) is 0.7, the dispersion slope takes negative values. The chromatic dispersion in this case is smaller than −70 (ps/km/nm).

If the diameter 2Da of the core 3 is not more than 2.6 μm and if the ratio (Da/Db) is 0.7, the dispersion slope takes positive values and thus, dispersion compensating fibers therein cannot demonstrate sufficient dispersion compensation.

Figure 4A:
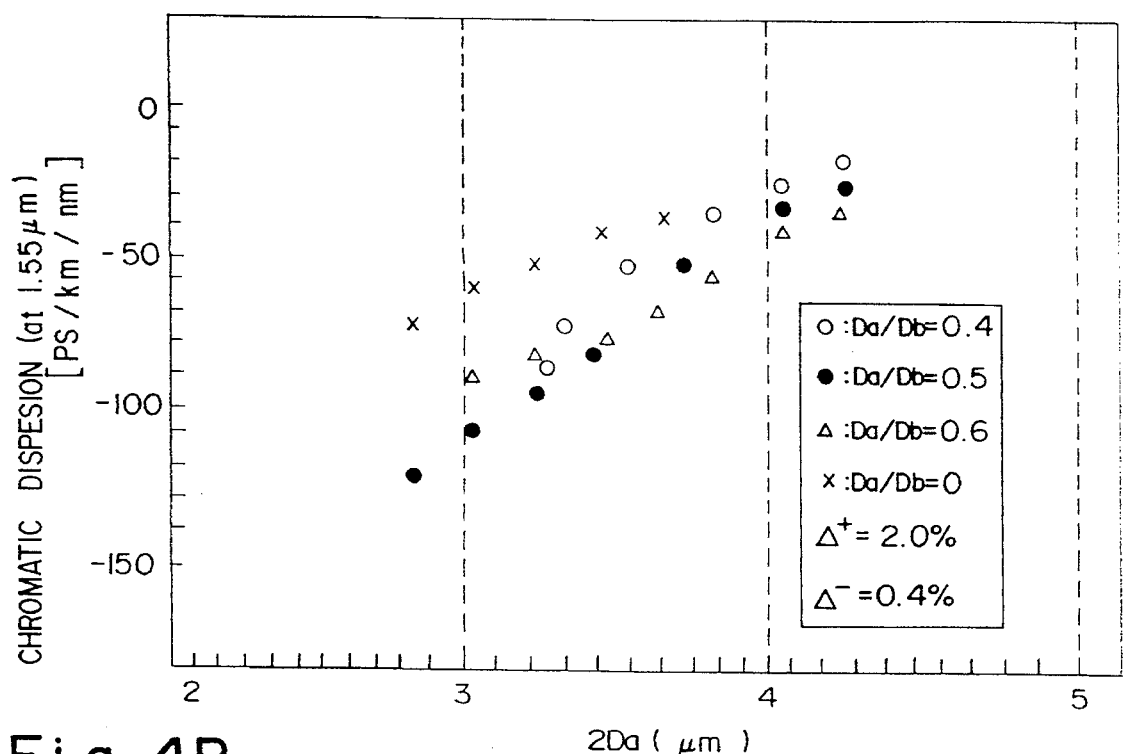
FIG. 4A shows a relation between the core diameter and the chromatic dispersion.
Figure 4B:
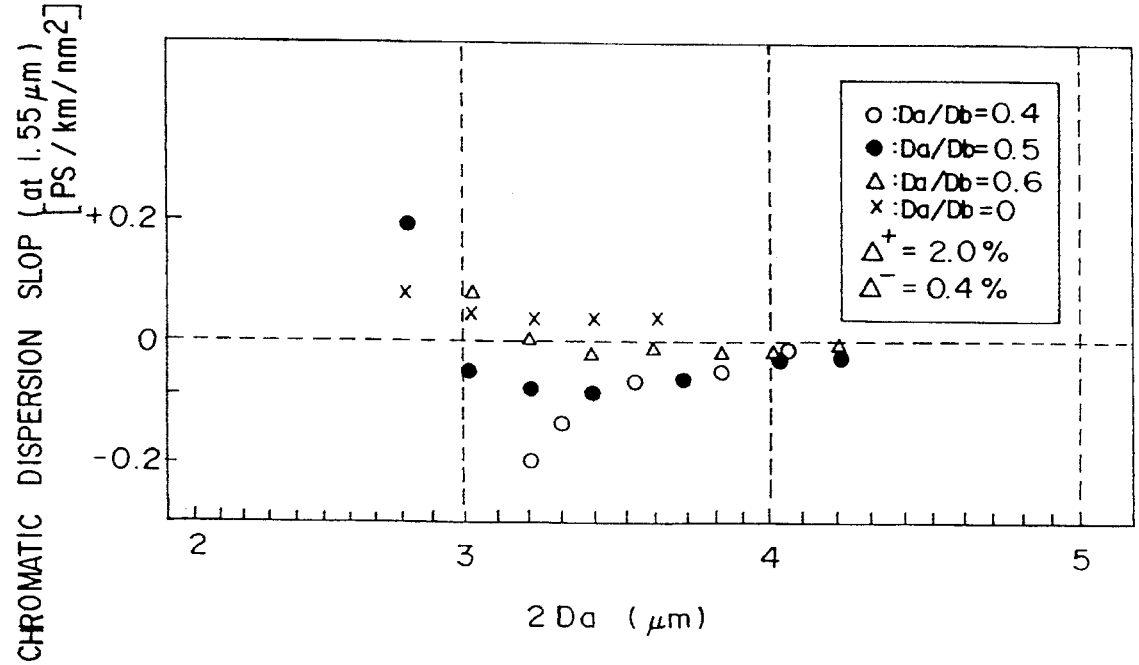
FIG. 4B shows a relation between the core diameter and the chromatic dispersion slope.

FIG. 4A shows a relation between the diameter 2Da of the core 3 and the chromatic dispersion (ps/nm/km) with the parameter of the ratio (Da/Db) of the diameter 2Da of the core 3 to the outer diameter 2Db of the first cladding 1. FIG. 4B shows a relation between the diameter 2Da of the core 3 and the dispersion slope (ps/km/nm$^2$) with the parameter of the ratio (Da/Db) of the diameter 2Da of the core 3 to the outer diameter 2Db of the first cladding 1. Here, the relative index difference $\Delta^+$ of the core 3 is 2.0% and the relative index difference $\Delta^-$ of the first cladding 1 is 0.4%.

As apparent from FIG. 4B, if the diameter 2Da of the core 3 is larger than 3 μm but smaller than 4 μm and if the ratio (Da/Db) is between 0.4 and 0.6 both inclusive, the dispersion slope of most dispersion compensating fibers take negative values and the chromatic dispersion thereof is smaller than −25 (ps/nm/km) but larger than −110 (ps/nm/km).

Accordingly, if the diameter 2Da of the core 3 is larger than 3 μm but smaller than 4 μm, if the ratio (Da/Db) is between 0.4 and 0.6 both inclusive, if the relative index difference $\Delta^+$ of the core 3 is 2.0%, and if the relative index difference $\Delta^-$ of the first cladding 1 is 0.4%, at least one dispersion compensating fiber can be produced with a chromatic dispersion of not more than −70 (ps/nm/km) and a negative dispersion slope (ps/km/nm$^2$).

When the dispersion compensating fiber has the bending diameter 2R of 40 mm, the bending loss $L_{bend}$ of the dispersion compensating fiber at the wavelength 1.55 μm is not more than 0.01 dB/m, and when the bending diameter 2R is 80 mm, the bending loss $L_{bend}$ of the dispersion compensating fiber at the wavelength 1.55 μm is not more than 0.000001 dB/m.

In summary, the dispersion compensating fiber has the bending loss $L_{bend}$ of fiber smaller than 0.01 dB/m at the wavelength 1.55 μm with the bending diameter 2R (where R is a radius of curvature of dispersion compensating fiber) being between 40 mm and 80 mm both inclusive, thus by bending the dispersion compensating fiber, a compact element can be produced using the dispersion compensating fiber.

When the ratio (Da/Db) is 0, that is, when the dispersion compensating fiber excludes the first cladding 1, the slope always takes positive values. Thus, dispersion compensating fibers without the first cladding 1 cannot compensate for the chromatic dispersion in a wide wavelength region.

As a comparative example, FIG. 13A and FIG. 13B show relations of the chromatic dispersion and dispersion slope, respectively, to the diameter 2Da of the core 3 with the ratio (Da/Db) being 0.3 and 0.7. Here, the relative index difference $\Delta^+$ of the core 3 is 2.0%, while the relative index difference $\Delta^-$ of the first cladding 1 is 0.4%.

As apparent from FIG. 13B, if the diameter 2Da of the core 3 is larger than 3.6 μm but smaller than 4 μm and if the ratio (Da/Db) is 0.3, the dispersion slope takes positive values and therefore, dispersion compensating fibers therein would fail to effect sufficient dispersion compensation. If the diameter 2Da of the core 3 is smaller than 3.4 μm but larger than 2.8 μm and if the ratio (Da/Db) is 0.3, the dispersion slope takes negative values, but the chromatic dispersion in this case is not less than −70 (ps/nm/km), and therefore, dispersion compensating fibers in this case cannot effect sufficient dispersion compensation. Further, if the diameter 2Da of the core 3 is not more than 2.8 μm and if the ratio (Da/Db) is 0.3, the dispersion slope takes negative values and the chromatic dispersion is not more than −70 (ps/nm/km). However, the bending loss $L_{bend}$ at the wavelength 1.55 μm in this case is larger than 0.01 dB/m with the bending diameter (2R) of 40 mm, and therefore, by bending the dispersion compensating fiber, a compact element using the dispersion compensating fiber cannot be produced.

If the diameter 2Da of the core 3 is between 2.6 μm and 5.0 μm both inclusive and if the ratio (Da/Db) is 0.7, the dispersion slope takes positive values and sufficient dispersion compensation cannot be made. Further, if the diameter 2Da of the core is not more than 2.9 μm, fibers have bending losses $L_{bend}$ thereof larger than 0.01 dB/m at the wavelength 1.55 μm with the bending diameter 2R (where R is a radius of curvature of dispersion compensating fiber) being between 40 mm and 80 mm both inclusive, and therefore, compact elements using the dispersion compensating fibers cannot be produced by bending the dispersion compensating fibers.

Figure 5A:
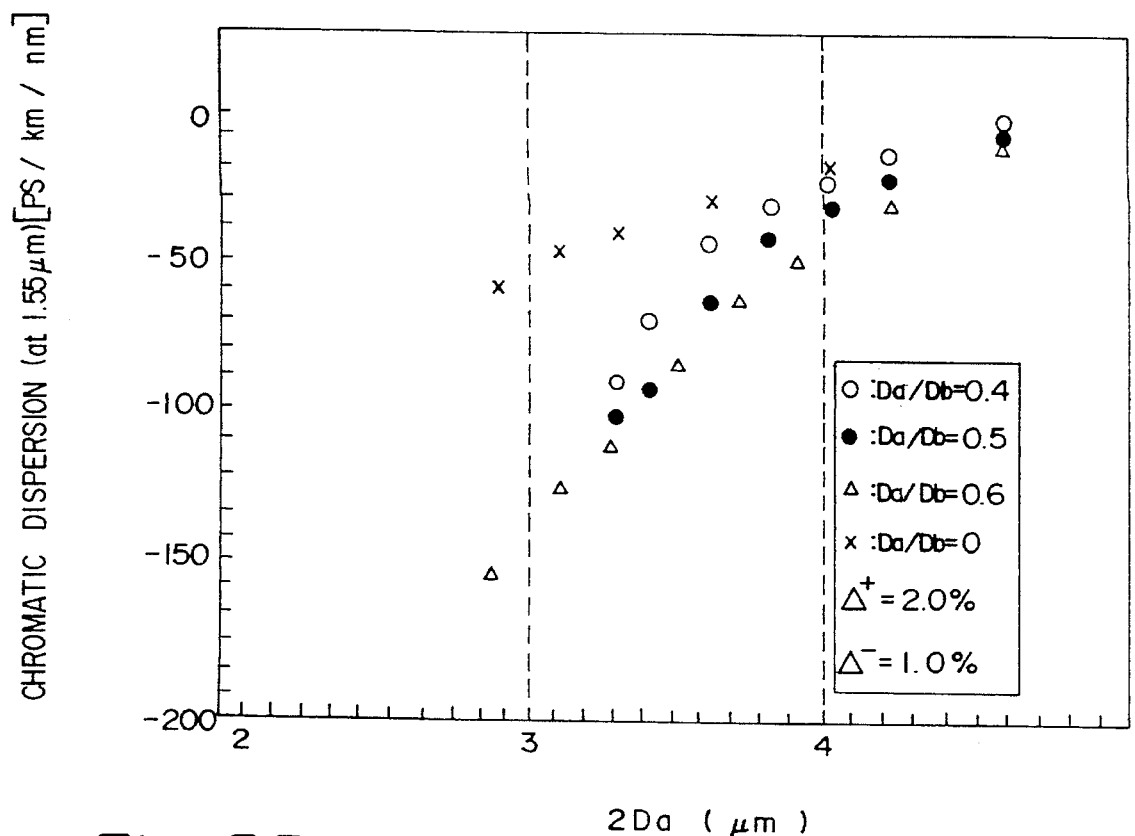
FIG. 5A shows a relation between the core diameter and the chromatic dispersion.
Figure 5B:
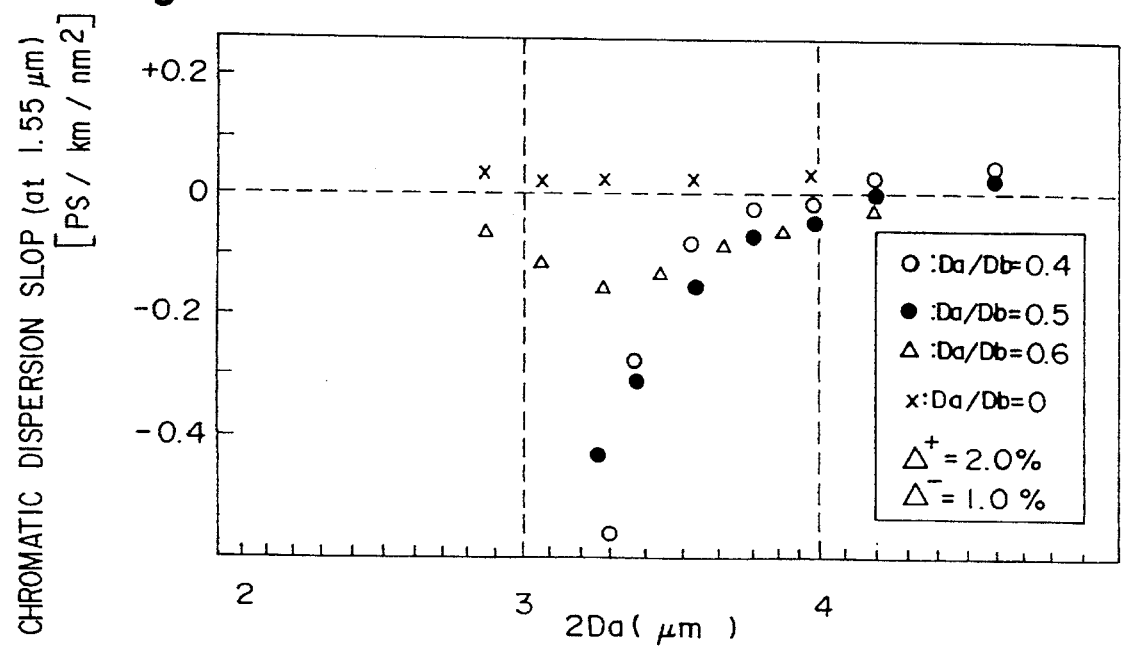
FIG. 5B shows a relation between the core diameter and the chromatic dispersion slope.

FIG. 5A shows a relation between the diameter 2Da of the core 3 and the chromatic dispersion (ps/nm/km) with the parameter of the ratio (Da/Db) of the diameter 2Da of the core 3 to the outer diameter 2Db of the first cladding 1. FIG. 5B shows a relation between the diameter 2Da of the core 3 and the dispersion slope (ps/km/nm$^2$) with the parameter of the ratio (Da/Db) of the diameter 2Da of the core 3 to the outer diameter 2Db of the first cladding 1. Here, the relative index difference $\Delta^+$ of the core 3 is 2.0% and the relative index difference $\Delta^-$ of the first cladding 1 is 1.0%.

As apparent from FIG. 5B, if the diameter 2Da of the core 3 is larger than 3 μm but smaller than 4 μm and if the ratio (Da/Db) is between 0.4 and 0.6 both inclusive, the dispersion slope takes negative values and the chromatic dispersion is smaller than −20 (ps/nm/km) but larger than −160 (ps/nm/km).

Accordingly, if the diameter 2Da of the core 3 is larger than 3 μm but smaller than 4 μm, if the ratio (Da/Db) is between 0.4 and 0.6 both inclusive, if the relative index difference $\Delta^+$ of the core 3 is 2.0%, and if the relative index difference $\Delta^-$ of the first cladding 1 is 1.0%, at least one dispersion compensating fiber can be produced with a chromatic dispersion of not more than −70 (ps/nm/km) and with a negative dispersion slope (ps/km/nm$^2$).

When the bending diameter 2R of the dispersion compensating fiber is 40 mm, the bending loss $L_{bend}$ of the dispersion compensating fiber at the wavelength 1.55 μm is not more than 0.01 dB/m, and the bending loss $L_{bend}$ of the dispersion compensating fiber at the wavelength 1.55 μm with the bending diameter 2R being 80 mm is not more than 0.000001 dB/m.

In summary, the dispersion compensating fiber has the bending loss $L_{bend}$ thereof smaller than 0.01 dB/m at the wavelength 1.55 μm with the bending diameter 2R (where R is a radius of curvature of dispersion compensating fiber) being between 40 mm and 80 mm both inclusive, and therefore, a compact elements using the dispersion compensating fiber cannot be produced by bending the dispersion compensating fiber.

When the ratio (Da/Db) is 0, that is, when the dispersion compensating fiber excludes the first cladding 1, the slope always takes positive values. Thus, dispersion compensating fibers without the first cladding 1 cannot compensate for the chromatic dispersion in a wide wavelength region.

Figure 14A:
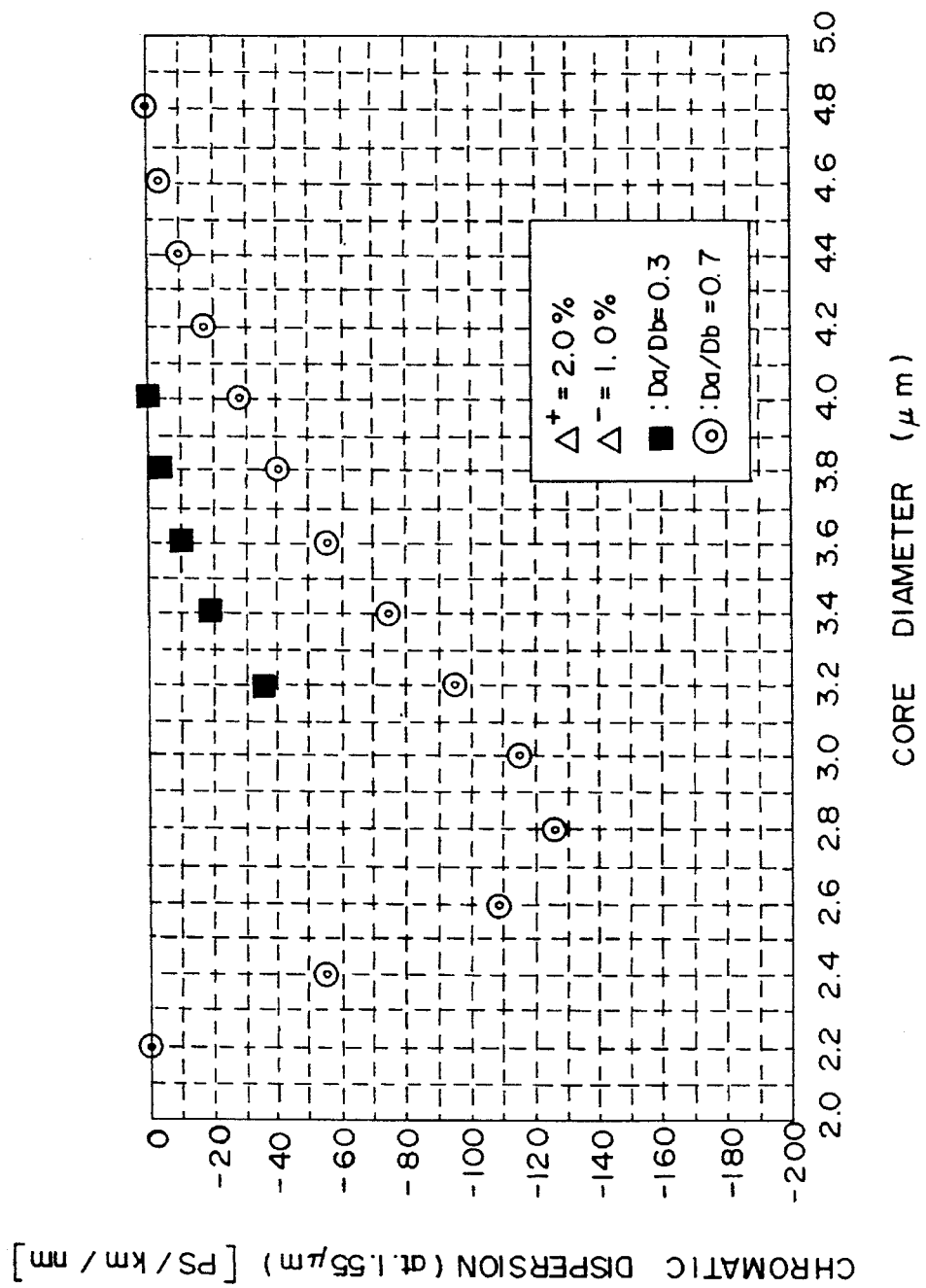
FIG. 14A shows a relation between the core diameter and the chromatic dispersion.

As a comparative example, FIG. 14A and FIG. 14B show relations of the chromatic dispersion and dispersion slope, respectively, to the diameter 2Da of the core 3 with the ratio (Da/Db) being 0.3 and 0.7. Here, the relative index difference $\Delta^+$ of the core 3 is 2.0%, while the relative index difference $\Delta^-$ of the first cladding 1 is 1%.

As apparent from FIG. 14B, if the diameter 2Da of the core 3 is larger than 3.6 μm and if the ratio (Da/Db) is 0.3, the dispersion slope takes positive values and dispersion compensating fibers therein cannot effect sufficient dispersion compensation. If the diameter 2Da of the core 3 is not more than 3.4 μm but larger than 3.2 μm and if the ratio (Da/Db) is 0.3, the dispersion slope takes negative values. However, in this case, the chromatic dispersion is not less than −70 (ps/nm/km) as shown in FIG. 14A, and therefore, dispersion compensating fibers therein are not suitable for practical application.

If the diameter 2Da of the core 3 is not more than 3.2 μm and if the ratio (Da/Db) is 0.3, with the bending diameter 2R of dispersion compensating fiber being 40 mm, the bending loss $L_{bend}$ of dispersion compensating fiber at the wavelength 1.55 μm is larger than 0.01 dB/m, and therefore, dispersion compensating fibers therein are not suitable for practical use.

If the diameter 2Da of the core 3 is between 3.4 μm and 4.4 μm both inclusive and if the ratio (Da/Db) is 0.7, the dispersion slope takes negative values. However, the chromatic dispersion in this case is not less than −70 (ps/nm/km) as shown in FIG. 14A, and dispersion compensating fibers therein cannot be used in practical application. Further, if the diameter 2Da of the core 3 is not more than 3.2 μm and if the ratio (Da/Db) is 0.7, the bending loss $L_{bend}$ of dispersion compensating fiber at the wavelength 1.55 μm with the bending diameter 2R of dispersion compensating fiber being 40 mm is larger than 0.01 dB/m, and dispersion compensating fibers therein are not suitable for practical application.

From the above results, the parameters of the dispersion compensating fiber according to the present embodiment satisfy the following relations:

$n1 < n2 < nc < n5$,

3 μm $< 2Da <$ 4 μm, $0.4 < (Da/Db) < 0.6$, $0.02 < \Delta^+ = (nc-n2)/n2 < 0.03$, $0.004 < \Delta^- = (n2-n1)/n2 < 0.01$, 40 mm $\leq 2R \leq$ 80 mm, $L_{bend} < 0.01$ dB/m (2R=40 mm).

The dispersion compensating optical fiber according to the above embodiment was wound around a bobbin with diameter 60 mm, and the transmission loss thereof was measured at the wavelength 1.55 μm. The transmission loss was 0.45 to 1.5 dB/km, and the bending loss $L_{bend}$ of light propagating in the bent dispersion compensating fiber would around the bobbin was not more than 0.0001 dB/m.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Application No.51680/1994 filed on Mar. 23, 1994 is hereby incorporated by reference.

What is claimed is:

1. An optical transmission system having a dispersion compensating optical fiber, wherein said dispersion compensating fiber comprises:

(a) a core;

(b) a first cladding surrounding the core; and (c) a second cladding surrounding the first cladding;

and wherein said dispersion compensating fiber satisfies the following relations:

$$n1 < n2 < nc,$$

$$3 \text{ μm} < 2Da < 4 \text{ μm},$$

$$0.4 < (Da/Db) < 0.6,$$

$$0.02 < (nc-n2)/n2 < 0.03,$$

$$0.004 < (n2-n1)/n2 < 0.01,$$

where nc is a refractive index of the core;

n1 is a refractive index of the first cladding;

n2 is a refractive index of the second cladding;

2Da is a diameter of the core; and

2Db is an outer diameter of the first cladding.

2. The system according to claim 1, wherein said dispersion compensating fiber further comprises a carbon film covering said second cladding in contact therewith and a resin film covering said carbon film in contact therewith, said resin film having a higher refractive index than the refractive index of said second cladding.

3. The system according to claim 1, wherein said dispersion compensating fiber further comprises a resin film covering said second cladding in contact therewith, said resin film having a higher refractive index than the refractive index of said second cladding.

4. The system according to claim 1, further comprising a bobbin around which said dispersion compensating fiber is wound, said bobbin having a diameter of between 40 mm and 80 mm both inclusive, wherein a bending loss of said dispersion compensating fiber with a bending diameter of 40 mm is not more than 0.01 dB/m at the wavelength 1.55 μm.

5. The system according to claim 1, wherein a bending loss of said dispersion compensating fiber with a bending diameter of 40 mm is smaller than 0.01 dB/m at the wavelength 1.55 μm.

6. The system according to claim 1, which comprises a light source, a single-mode optical fiber connected to the light source and having zero dispersion at a predetermined wavelength between 1290 nm and 1330 nm, and an erbium-doped fiber connected to said single-mode optical fiber, wherein said dispersion compensating optical fiber is connected to said erbium-doped fiber, wherein said dispersion compensating optical fiber is wound around a bobbin having a diameter of between 40 mm and 80 mm both inclusive, and wherein a bending loss of said dispersion compensating fiber with a bending diameter of 40 mm is not more than 0.01 dB/m at the wavelength 1.55 μm.

7. The system according to claim 1, wherein said dispersion compensating fiber satisfies the following relation:

$$0.024 \times Dc < Da < 0.032 \times Dc$$

where 2Dc is an outer diameter of the second cladding.

8. The system according to claim 1, wherein said dispersion compensating fiber has a chromatic dispersion smaller than −70 ps/nm/km at the wavelength of 1.55 μm.

9. An optical transmission system comprising:

(a) a light source;

(b) a single-mode optical fiber connected to the light source and having zero dispersion at a predetermined wavelength between 1290 nm and 1330 nm;

(c) an erbium-doped fiber connected to said single-mode optical fiber;

(d) A bobbin having a diameter of between 40 mm and 80 mm both inclusive;

(e) a dispersion compensating fiber connected to said erbium-doped fiber and wound around said bobbin, wherein a bending loss thereof when wound around said bobbin is smaller than 0.01 dB/m at the wavelength 1.55 μm, wherein said dispersion compensating fiber has a core, a first cladding surrounding the core, and a second cladding surrounding the first cladding, and wherein the dispersion compensating fiber satisfies the following relations:

$$n1 < n2 < nc,$$

$$3 \text{ μm} < 2Da < 4 \text{ μm},$$

$$0.4 < (Da/Db) < 0.6,$$

$$0.02 < (nc-n2)/n2 < 0.03,$$

$$0.004 < (n2-n1)/n2 < 0.01,$$

where nc is a refractive index of the core;

n1 is a refractive index of the first cladding;

n2 is a refractive index of the second cladding;

2Da is a diameter of the core; and

2Db is an outer diameter of the first cladding.

10. The system according to claim 9, wherein said dispersion compensating fiber further comprises a resin film covering said second cladding in contact therewith, said resin film having a higher refractive index than the refractive index of said second cladding.

11. The system according to claim 9, wherein said dispersion compensating fiber satisfies the following relation:

$$0.024 \times Dc < Da < 0.032 \times Dc$$

where 2Dc is an outer diameter of the second cladding.

12. A dispersion compensating optical fiber, comprising:

(a) a core;

(b) a first cladding surrounding the core; and (c) a second cladding surrounding the first cladding;

and wherein said dispersion compensating fiber satisfies the following relations:

$$n1 < n2 < nc,$$

$$3 \text{ μm} < 2Da < 4 \text{ μm},$$

$$0.4 < (Da/Db) < 0.6,$$

$$0.02 < (n_c - n_2)/n_2 < 0.03,$$

$$0.004 < (n_2 - n_1)/n_2 < 0.01,$$

where $n_c$ is a refractive index of the core;

$n_1$ is a refractive index of the first cladding;

$n_2$ is a refractive index of the second cladding;

$2D_a$ is a diameter of the core; and $2D_b$ is a outer diameter of the first cladding.

13. A fiber according to claim 12, further comprising a carbon film covering said second cladding in contact therewith and a resin film covering said carbon film in contact therewith, said resin film having a higher refractive index than the refractive index of said second cladding.

14. A fiber according to claim 12, further comprising a resin film covering said second cladding in contact therewith, said resin film having a higher refractive index than the refractive index of said second cladding.

15. A fiber according to claim 12, wherein at a bending diameter of 40 mm, the fiber has a bending loss that is smaller than 0.01 dB/m at the wavelength 1.55 μm.

16. A fiber according to claim 12, arranged so as to satisfy the following relation:

$$0.024 \times D_c < D_a < 0.032 \times D_c$$

where $2D_c$ is an outer diameter of the second cladding.

17. A fiber according to claim 12, wherein said dispersion compensating fiber has a chromatic dispersion smaller than −70 ps/nm/km at the wavelength of 1.55 μm.

* * * * *